Jan. 24, 1967    E. LAGELBAUER    3,299,639
TURBOFAN ENGINE
Filed Dec. 24, 1963
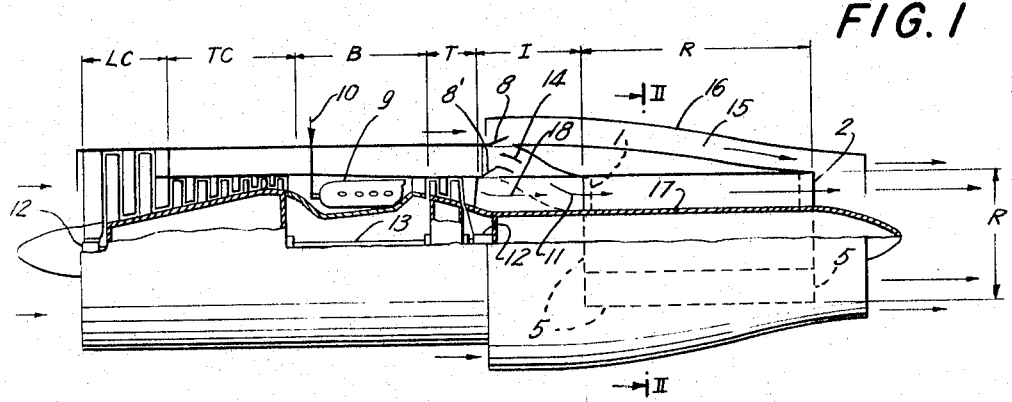
FIG. 1
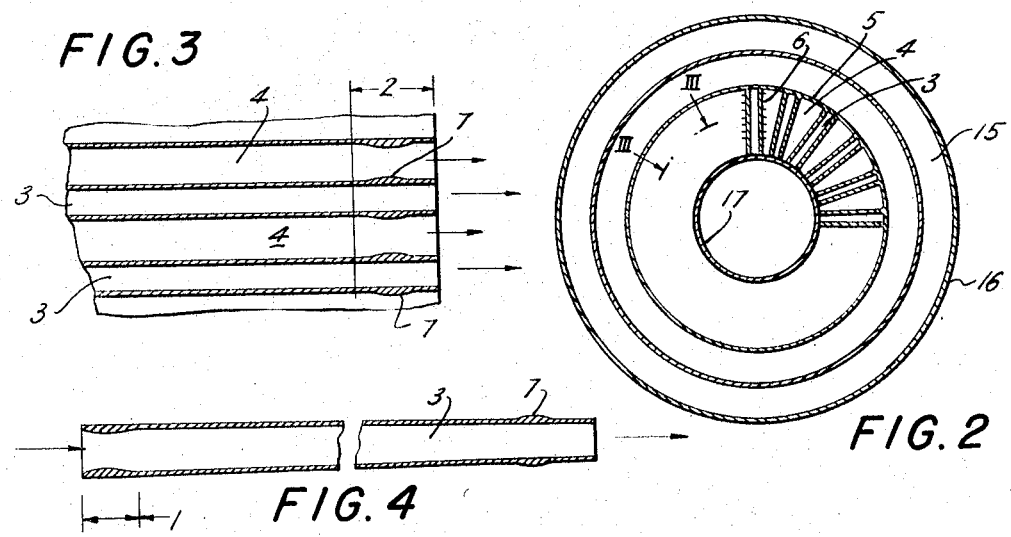
FIG. 3
FIG. 2
FIG. 4
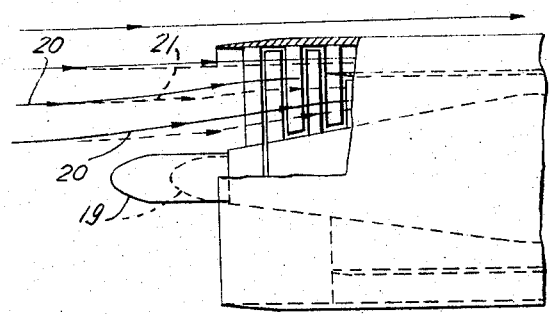
FIG. 5
INVENTOR.
ERNEST LAGELBAUER

United States Patent Office 3,299,639
Patented Jan. 24, 1967

3,299,639
TURBOFAN ENGINE
Ernest Lagelbauer, 410 E. 13th St.,
New York, N.Y. 10009
Filed Dec. 24, 1963, Ser. No. 333,799
7 Claims. (Cl. 60—226)

The present invention relates to turbofan engines and more particularly to a double or triple flow turbofan engine.

It is an object of the present invention to provide an engine which utilizes heat of combustion more efficiently than heretofore possible without adding substantial weight to the engine as a whole.

The present invention is applicable to turbofan engines in general, as well as to engines of the type disclosed in applicant's prior Patent 2,603,946, and, briefly, contemplates transferring heat from the still hot exhaust gases to air in parallel flow, and expand the heated air to extract additional energy therefrom.

The present invention relates thus to turbofan engines in which the turbine discharge gases are accelerated to the final jetting velocity, that is, complete conversion of the available residual pressure/heat potential into kinetic energy. According to the invention, heat is abstracted from the discharge gases within a secondary heat exchanger for heating the secondary airflow of intermediate pressure; means are provided for isentropic expansion of the secondary airflow to the attainable jetting velocity which takes place only after maximum feasible absorption of heat by the secondary airflow from the high-velocity turbine discharge gases. Both turbine gases and airflow may expand directly to the ambient atmospheric pressure.

FIG. 1 is a schematic vertical view of the turbofan engine, half of which is in sections; FIG. 2 is a cross sectional view on line II—II of FIG. 1, showing part of the heat exchanger elements only; FIG. 3 is a partial developed sectional view along lines III—III of FIG. 2; FIG. 4 is an enlarged view of a section through the secondary heat exchanger, and illustrating the placement of the constriction to form a nozzle; and FIG. 5 is a partial enlarged view, partly in section, of the intake region of the engine.

FIGURE 1 shows a triple-flow version of such an engine, using a heat exchanger with radially arranged flow passages (other configurations of the regenerator flow passages are equally feasible). The engine, generally shown in FIG. 1, is arranged in a plurality of sections; in the direction of air flow: the air intake is at the left hand side of FIG. 1, in advance of the low pressure compressor section LC; it is followed by a turbine compressor section TC; next the combustion or burner section B, then a turbine and throat section T, an intermediate section I, a heat exchanger section R, and finally, the exhaust or end section 2 of the engine at the right hand side of FIG. 1. The diameter indication R on the right hand side of FIG. 1 likewise refers to the heat exchanger section.

Combustion section B has a burner unit 9, with a fuel line schematically shown at 10. Expansion nozzles 1 (FIG. 4) are located in the exhaust passage from which gases are led by turbine gas passages 3 (FIGS. 2, 3, 4) to the secondary heat exchanger generally indicated at 5. The compressor blades themselves are mounted on a shaft 13, retained in bearings 12 (FIG. 1). A centroid body 17, only schematically indicated and well known in the art, may be provided. The heat exchanger 5 is in the form of an annulus around the center body 17 (FIG. 2). A forward centroid body 19 (FIG. 5) may be placed just in advance of the low pressure compressor section L–C. This body may be longitudinally movable from a solid line to a dotted line position, as schematically shown in FIG. 5, and as also known in the art.

Air enters at the intake end of the engine, ahead of section L–C and is split into a pair of passages. One passage leads to combustion chamber B, where the compressed air is heated. The turbine discharge enters respective passages 3 on the heat exchanger 5 through radially elongated isentropic expansion nozzles 1; each flow passage has its own individual expansion nozzle. The walls forming the flow passages 3 are provided with radiating fins 6 (only one such wall is shown as equipped with fins 6, for purposes of clarity, in FIG. 2) in order to increase heat transfer into the adjacently formed passages 4. Passages 4 are supplied with air, compressed in low pressure section L–C to absorb heat still contained in the turbine gases. FIGURE 2 shows a transverse section through the engine at station 2, illustrating the regenerator arrangement with turbine-gas passages 3 and air passages 4. The expansion nozzles 2 for the ariflow are likewise situated in one transverse plane. The constriction of the airflow passages, formed by nodes running parallel to the orifice mouth, are required for the air expansion to take place after its having absorbed heat from the hot flow; in the event of supersonic jetting of the air, these constrictions represent the throats of deLaval nozzles. A further isentropic expansion nozzle for the combined gas flow of turbine exhaust and air may be provided at the discharge end of the engine. The turbofan engine is pre-eminently suited for propulsion of high subsonic speed aircraft. The design will in general provide for high subsonic or transonic jetting of the airflow. The nozzle throat imposes flow limitations when the flow velocity is critically sonic, at design temperatures. When flow conditions arise which are not contemplated by the design, such as under temporary overloading of the engines during take-off, means must be provided for diverting the excess of turbine discharge gases from entering into the heat exchanger, into the airflow passage as dictated by the stagnation of the turbine flow to prevent abnormal rise of the turbine back-pressure. One or more relief gates 8 used for this purpose bypasses flow into a tertiary air passage 15, formed by a duct 16 (FIGS. 1, 2). Gate 8 can be automatically operating or its actuation incorporated in the general engine instrumentation and control system. In cases of engine designs where the air jetting is supersonic or the possibility of supersonic air jet velocity exists, particularly under overload conditions, similar flow diversion is advisable or necessary. Relief gate(s) 8 may also spill the excess of airflow into the surrounding atmospheric air while in the case of a triple-flow engine as indicated in FIGURE 1 it is bypassed, into the tertiary airflow passage. Flow choking at the nozzle throats is for both flow components largely self obtained by virtue of the increase of sonic velocity with higher temperatures and of the increase of the critical pressure (diminution of the specific volume at the nozzle throat) with increasing initial pressure. Both conditions usually arise during overload performance of the engine.

Another important device for obviating the tendency of flow choke during overload operation of the engine consists in suitably apportioning the air entering in front of the engine between turbine (ducts 3—FIGS. 1 and 2) and secondary air flow (ducts 4), which can be accomplished either by suitably located adjustable deflector vanes at the engine intake or by means of the position adjustable centroid body 19, FIGURE 5. Solid arrow lines 20 and dashed arrow lines 21 (FIG. 5) indicate the stream-lined air flow with centroid 19 in its forward solid line or rearward dashed line position, respectively. The arrows in FIG. 1 indicate air flow as will be obvious. Vanes 14 are flow deflection blades, to change the radial direction of secondary air flow, arrows 11. The turbine discharge flow is indicated by arrows 18. In FIG. 1, arrows 11 and arrows 18 only seem to indicate the same passage; the direction of flow will be the same, although the passages will be separated from each other by the ducting, as clearly appeared from the sectional view, FIG. 2. By-pass for turbine gases from ducts 3 either to the atmosphere, or to tertiary passage 15, can be by a by-pass valve 8', operable similar to by-pass valve 8 for the secondary duct.

FIGURE 4 shows a section through a heat exchanger duct, the view corresponding to that of FIGURE 3; the nodes 7 shown are not required if the air jetting is consistently subsonic.

It should be noted that, with regard to the diminution of the specific volume of the hot gasflow commensurate with the heat therefrom abstracted in the regenerator by the airflow and with the requirement of essentially unreduced jetting velocity of the turbine gases, the passages for the latter are to be made tapering. In the engine design, the degree of taper is made correct for the principal operating condition of the engine, while for off-design conditions the slight resulting imperfection can be regarded insignificant as to economy of operation in view of the relatively brief duration of such performance.

The contribution of a tertiary airflow component to propulsion, incorporated in FIGURE 1, consists in the attending Venturi-type thrust augmentor action of the duct configuration 15 by acceleration of supplementary air masses. The advantages gained with this invention in providing heat exchange between the turbine discharge and a secondary propulsive airflow component, instead of between the turbine discharge and the compressed combustion air as conventional with regenerative gas-turbine cycles, are twofold: Firstly, far larger a proportion of the residual heat in the turbine discharge can be recovered owing to the copious relatively cool secondary airflow available for heat absorption, and secondly, the minimum involved penalties of plant complication and added weight. Further, the minimum parasite frontal area offered by such an engine does not exceed that of an ordinary turbofan engine. The incorporation of a thrust reverser in the engine of the present invention is feasible and identical to respective features applied to other types of turbojet engines.

I claim:
1. A turbofan engine comprising a casing having an inlet and an outlet; a fan receiving air from said inlet; primary duct means and secondary duct means receiving air compressed by said fan; said primary duct means and said secondary duct means being disposed in flow parallel; said primary duct means having in flow series a compressor, a combustion chamber, a turbine for driving said fan and said compressor, a plurality of first heat exchanger passages and isentropic expansion nozzles formed at the upstream end of said first passages; said secondary duct mean having in flow series second heat exchanger passages, said second heat exchanger passages being parallel to and disposed adjacent said first heat exchanger passages to be in heat exchange relation thereto around an annulus upstream of said casing outlet; and second isentropic expansion nozzles formed at the downstream end of said second passages.

2. Engine as claimed in claim 1 including pressure relief means in said secondary duct means upstream of said second heat exchanger passages for spilling excess air from said duct means.

3. Engine as claimed in claim 1 further including a by-pass duct; and pressure relief means in said secondary duct means upstream of said second heat exchanger passages spilling excess air into said by-pass duct.

4. Engine as claimed in claim 1 including pressure relief means in said primary duct means upstream of said first heat exchanger passages to spill air from said primary duct means.

5. Engine as claimed in claim 4, the outlet of said pressure relief means venting to the atmosphere.

6. Engine as claimed in claim 1 including a tertiary duct means, said tertiary duct means being formed to include a venturi duct configuration to increase thrust.

7. Engine as claimed in claim 1, wherein said second heat exchanger passages are disposed alternately with said first heat exchanger passages.

References Cited by the Examiner
UNITED STATES PATENTS

| | | | |
|---|---|---|---|
| 1,742,348 | 1/1930 | Gamble | 165—174 |
| 2,357,251 | 8/1944 | Behr | 165—174 X |
| 2,603,946 | 7/1952 | Lagelbauer | 60—35.6 |
| 3,118,276 | 1/1964 | Keenan | 60—35.6 |

MARK NEWMAN, *Primary Examiner.*

D. HART, *Assistant Examiner.*